DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 13, 1970

870 O.G. 394

T870,013

SYNTHETIC PIGMENTS AND THEIR USE IN PLASTIC MATERIALS

Gordon C. Newland, Kingsport, Tenn., and John W. Tamblyn, Jonas Ridge, N.C. (both % Tennessee Eastman Co., P.O. Box 511, Kingsport, Tenn. 37662)

Filed Oct. 31, 1968, Ser. No. 772,379

Int. Cl. C08b *21/08, 21/14;* C08g *39/10*

U.S. Cl. 260—16

No Drawing. 9 Pages Specification

Synthetic pigments having good thermal and UV stability are prepared by blending a triphenodioxazine compound or a 4,4′-bis(benzoxazol-2-yl) stilbene compound with a polyester such as poly(1,4-cyclohexylene dimethylene terephthalate) during the polymerization thereof, and thereafter comminuting the pigmented polymer to pigment proportions by grinding or other well known comminuting procedures.